United States Patent
Kang

(10) Patent No.: US 9,325,981 B2
(45) Date of Patent: Apr. 26, 2016

(54) IMAGE DISPLAY DEVICE CAPABLE OF SELECTIVELY IMPLEMENTING 2D IMAGE AND 3D IMAGE

(75) Inventor: Dongwoo Kang, Goyang-si (KR)

(73) Assignee: LG DISPLAY CO., LTD., Seoul (KR)

( * ) Notice: Subject to any disclaimer, the term of this patent is extended or adjusted under 35 U.S.C. 154(b) by 948 days.

(21) Appl. No.: 13/312,772

(22) Filed: Dec. 6, 2011

(65) Prior Publication Data

US 2012/0212590 A1    Aug. 23, 2012

(30) Foreign Application Priority Data

Feb. 18, 2011    (KR) ........................ 10-2011-0014547

(51) Int. Cl.
*H04N 13/04*    (2006.01)

(52) U.S. Cl.
CPC ....... *H04N 13/0438* (2013.01); *H04N 13/0454* (2013.01); *H04N 13/0497* (2013.01); *H04N 13/0452* (2013.01)

(58) Field of Classification Search
None
See application file for complete search history.

(56) References Cited

U.S. PATENT DOCUMENTS

| | | | | |
|---|---|---|---|---|
| 6,043,838 A * | 3/2000 | Chen | ...................... | G06T 7/0022 348/42 |
| 2003/0071892 A1* | 4/2003 | Lee et al. | ......................... | 348/42 |
| 2010/0149320 A1* | 6/2010 | MacNaughton et al. | ....... | 348/51 |
| 2010/0150523 A1* | 6/2010 | Okubo et al. | .................... | 386/68 |
| 2011/0007136 A1* | 1/2011 | Miura et al. | ..................... | 348/46 |
| 2011/0023066 A1* | 1/2011 | Jang et al. | ......................... | 725/54 |
| 2011/0032338 A1* | 2/2011 | Raveendran et al. | ........... | 348/51 |
| 2011/0096832 A1* | 4/2011 | Zhang et al. | ............. | 375/240.08 |
| 2011/0109808 A1* | 5/2011 | Li | ............................. | H04N 5/45 348/725 |
| 2012/0062706 A1* | 3/2012 | Keshavmurthy | ..... | G01B 11/245 348/47 |
| 2012/0120191 A1* | 5/2012 | Lee | ................................. | 348/43 |
| 2013/0235153 A1 | 9/2013 | Sanderson et al. | | |

FOREIGN PATENT DOCUMENTS

| | | |
|---|---|---|
| CN | 1335716 A | 2/2002 |
| CN | 101038732 A | 9/2007 |
| CN | 101616334 A | 12/2009 |
| CN | 101754040 A | 6/2010 |

* cited by examiner

*Primary Examiner* — Joseph Ustaris
*Assistant Examiner* — Edemio Navas, Jr.
(74) *Attorney, Agent, or Firm* — Birch, Stewart, Kolasch & Birch, LLP

(57) ABSTRACT

An image display device includes a system block producing source data from a video signal received from the outside, a display block displaying 2D data or 3D data included in the source data, and a multifunctional block including a single multifunctional chip for integrating a first function, a second function, and a third function and a memory. The first function reflects a depth information on the 2D data based on motion evaluation for extracting an object and converts the 2D data into the 3D data. The second function renders the 3D data in conformity with a driving environment of the display block. The third function up-converts a frame rate of the 2D data based on the motion evaluation. The memory individually stores the 2D data of a predetermined amount for the motion evaluation.

6 Claims, 4 Drawing Sheets

IMAGE DISPLAY DEVICE CAPABLE OF SELECTIVELY IMPLEMENTING 2D IMAGE AND 3D IMAGE

This application claims the benefit of Korean Patent Application No. 10-2011-0014547 filed on Feb. 18, 2011, which is incorporated herein by reference for all purposes as if fully set forth herein.

BACKGROUND OF THE INVENTION

1. Field of the Invention

Embodiments of the invention relate to an image display device capable of selectively implementing a two-dimensional plane image (hereinafter referred to as '2D image') and a three-dimensional stereoscopic image (hereinafter referred to as '3D image').

2. Discussion of the Related Art

Image display devices implement a 3D image using a stereoscopic technique or an autostereoscopic technique.

The stereoscopic technique, which uses a parallax image between left and right eyes of a user with a high stereoscopic effect, includes a glasses type method and a non-glasses type method, both of which have been put to practical use. In the non-glasses type method, an optical plate such as a parallax barrier for separating an optical axis of the parallax image between the left and right eyes is generally installed in front of or behind a display screen. In the glasses type method, left and right eye images each having a different polarization direction are displayed on a liquid crystal display panel, and a stereoscopic image is implemented using polarized glasses or liquid crystal shutter glasses.

The glasses type method is mainly classified into a first polarizing filter method using a patterned retarder film and polarized glasses, a second polarizing filter method using a switching liquid crystal layer and polarized glasses, and a liquid crystal shutter glasses method.

In the liquid crystal shutter glasses method, a left eye image and a right eye image are alternately displayed on a display element every one frame, and a left eye shutter and a right eye shutter of liquid crystal shutter glasses are opened and closed in synchronization with display timing of the display element, thereby implementing a 3D image. The liquid crystal shutter glasses open only the left eye shutter during an nth frame period, in which the left eye image is displayed, and open only the right eye shutter during an (n+1)th frame period, in which the right eye image is displayed, thereby making binocular disparity in a time division method, where n is a natural number.

A first chip is mounted on a system board of the image display device as a component for reflecting a depth information on 2D data to convert the 2D data into 3D data. A second chip is mounted on a control board of a display module physically separated from the system board as a frame rate-up conversion unit for removing a motion blur of the 2D data and a 3D formatter for rendering the 3D data. Further, a first memory of the first chip is mounted on the system board and individually stores the 2D data of a predetermined amount (for example, one frame). A second memory of the second chip is mounted on the control board separately from the first memory and individually stores the 2D data of a predetermined amount, so as to extract an object from an original image of the 2D data.

A data conversion unit of the first chip evaluates a motion on reference to the first memory, extracts the object from the original image of the 2D data, and extracts the depth information to be reflected on the 2D data based on the extracted object. The frame rate-up conversion unit of the second chip evaluates a motion on reference to the second memory, extracts the object from the original image of the 2D data, and inserts an interpolation frame into each frame of the 2D data based on the extracted object, thereby increasing a frame rate.

The related art image display device has the individual first and second chips, which do not share main algorithm cores related to image processing with each other, on the system board and the control board. Therefore, complexity of the configuration of the related art image display device increases, and the image processing efficiency is reduced. Further, because the individual first and second chips each have a memory, the manufacturing cost of the related art image display device increases.

SUMMARY OF THE INVENTION

Embodiments of the invention provide an image display device capable of increasing image processing efficiency and reducing the manufacturing cost by integrating image processing related parts into one chip.

In one aspect, there is an image display device comprising a system block configured to produce source data from a video signal received from the outside, a display block configured to display 2D data or 3D data included in the source data, and a multifunctional block including a single multifunctional chip for integrating a first function, a second function, and a third function and a memory, the first function reflecting a depth information on the 2D data based on motion evaluation for extracting an object and converting the 2D data into the 3D data, the second function rendering the 3D data in conformity with a driving environment of the display block, the third function up-converting a frame rate of the 2D data based on the motion evaluation, the memory individually storing the 2D data of a predetermined amount for the motion evaluation.

The multifunctional block is mounted on a control board included in the display block or a system board included in the system block.

The single multifunctional chip includes a data deciding unit configured to decide whether the source data is the 2D data or the 3D data, a motion evaluating unit configured to compare 2D data of a current frame received from the data deciding unit with 2D data of a previous frame stored in the memory when the source data is the 2D data, evaluate a motion of the 2D data, and extract an object from the 2D data of the current frame based on the motion evaluation, a dimensional converter configured to extract a depth information previously determined based on the extracted object, merge the extracted depth information into the 2D data received from the motion evaluating unit, and convert the merged 2D data into the 3D data, a 3D formatter configured to render the 3D data received from the dimensional converter and the 3D data received from the data deciding unit when the source data is the 3D data in conformity with the driving environment of the display block, and a frame rate-up conversion processing unit configured to enhance the image quality of the 2D data, insert an interpolation frame, which is previously determined based on a movement of the object, between frames of the 2D data with the enhanced image quality, and compensate for a motion blue of the 2D data received from the motion evaluating unit.

The motion evaluating unit supplies the dimensional converter with the 2D data, whose the object is extracted in a 3D mode in response to a mode selection signal received from the outside. The motion evaluating unit supplies the frame rate-up conversion processing unit with the 2D data, whose the object is extracted in a 2D mode in response to the mode selection signal.

The single multifunctional chip further includes an input interface unit configured to receive the source data from the system block, a 3D image enhancing unit configured to enhance the image quality of the 3D data, which is input from the data deciding unit to the 3D formatter, and an output interface unit configured to output the 3D data received from the 3D formatter and the 2D data received from the frame rate-up conversion processing unit to the display block.

The display block is implemented as a polarized glasses type display element or a liquid crystal shutter glasses type display element.

The single multifunctional chip shares algorithm cores for the first to third functions.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE ILLUSTRATED EMBODIMENTS

Reference will now be made in detail to embodiments of the invention, examples of which are illustrated in the accompanying drawings. Wherever possible, the same reference numbers will be used throughout the drawings to refer to the same or like parts. It will be paid attention that detailed description of known arts will be omitted if it is determined that the arts can mislead the embodiments of the invention.

Embodiments of the invention will be described with reference to FIGS. 1 to 5.

Figure 1:
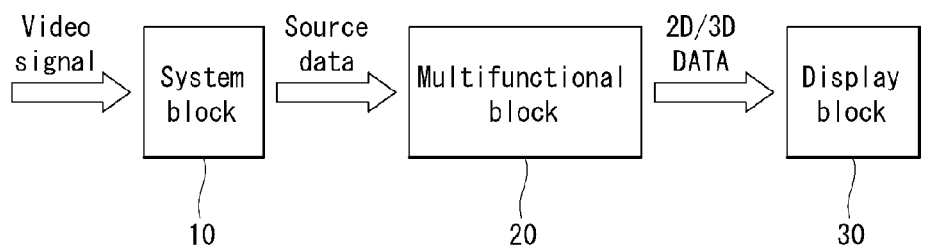
FIG. 1 schematically illustrates a configuration of an image display device according to an exemplary embodiment of the invention.

As shown in FIG. 1, an image display device according to an embodiment of the invention includes a system block 10, a multifunctional block 20, and a display block 30.

The system block 10 includes a tuner, a demodulator, and a system-on chip (SOC). The tuner receives an analog compressed transmission signal or a digital compressed transmission signal. The demodulator extracts only a video signal from the analog or digital compressed transmission signal received from the tuner and produces source data. The source data is output to the multifunctional block 20 via the SOC. The SOC supports all of several standards of the world and has a function for constructing a common digital TV platform, a function for improving the image quality in consideration of characteristics of a display device, a graphic function for supporting a data broadcasting and an internet, a personal video recorder (PVR) function for writing information to a hard disk and reproducing the information, a networking function for connecting various peripheral devices, etc. For this, the SOC includes a built-in CPU, various decoders, a scaler, a deinterlacer, etc.

The display block 30 may be implemented as a polarized glasses type display element or a liquid crystal shutter glasses type display element.

Figure 2:
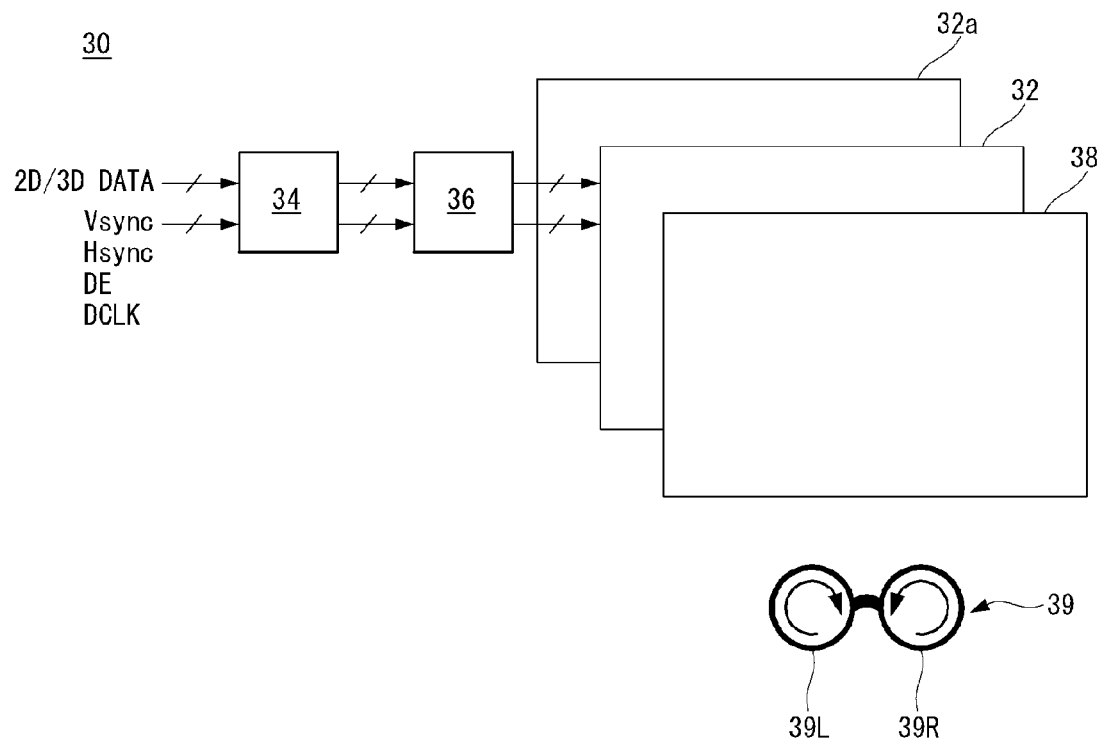
FIG. 2 illustrates a display block implemented as a polarized glasses type display element.

As shown in FIG. 2, when the display block 30 is implemented as the polarized glasses type display element, the display block 30 includes a display panel 32, a timing controller 34, a panel driver 36, a retarder 38, and polarized glasses 39.

The display panel 32 may be implemented as a panel of a flat panel display such as a liquid crystal display (LCD), a field emission display (FED), a plasma display panel (PDP) device, an organic light emitting diode (OLED) display, and an electrophoretic display (EPD). In the following description, the image display device according to the embodiment of the invention is described using the liquid crystal display panel as an example of the display panel 32.

The display panel 32 includes an upper glass substrate, a lower glass substrate, and a liquid crystal layer between the upper and lower glass substrates. The display panel 32 includes liquid crystal cells, which are arranged in a matrix form based on a crossing structure of data lines and gate lines. A pixel array including the data lines, the gate lines, thin film transistors (TFTs), pixel electrodes, and storage capacitors is formed on the lower glass substrate of the display panel 32. The liquid crystal cells are driven by an electric field between the pixel electrodes connected to the TFTs and common electrodes. Black matrixes, color filters, and the common electrodes are formed on the upper glass substrate of the display panel 32. An upper polarizing film and a lower polarizing film are respectively attached to the upper glass substrate and the lower glass substrate of the display panel 32. Alignment layers for setting a pre-tilt angle of liquid crystals are respectively formed on the upper glass substrate and the lower glass substrate of the display panel 32. In a vertical electric field driving manner such as a twisted nematic (TN) mode and a vertical alignment (VA) mode, the common electrodes are formed on the upper glass substrate. In a horizontal electric field driving manner such as an in-plane switching (IPS) mode and a fringe field switching (FFS) mode, the common electrodes are formed on the lower glass substrate along with the pixel electrodes. A column spacer may be formed between the upper and lower glass substrates to keep cell gaps of the liquid crystal cells constant.

The display panel 32 may be implemented in any liquid crystal mode as well as the TN, VA, IPS, and FFS modes. The display panel 32 according to the embodiment of the invention may be implemented as a panel of any type liquid crystal display including a backlit liquid crystal display, a transflective liquid crystal display, and a reflective liquid crystal display. A backlight unit 32a is necessary in the backlit liquid crystal display and the transflective liquid crystal display. The backlight unit 32a may be implemented as a direct type backlight unit or an edge type backlight unit.

The timing controller 34 receives timing signals such as a vertical sync signal Vsync, a horizontal sync signal Hsync, a data enable DE, and a dot clock DCLK from the system block 10 and generates control signals for controlling operation timing of the panel driver 36 using the timing signals. The timing controller 34 receives 2D data or 3D data from the multifunctional block 20 and supplies the 2D/3D data to the panel driver 36. The timing controller 34 multiplies the frequency of the timing signals Vsync, Hsync, DE, and DCLK synchronized with an input frame frequency, thereby controlling the panel driver 36 so that an operation of the panel driver 36 is faster than the input frame frequency. The input frame frequency is 50 Hz in a phase alternate line (PAL) scheme and 60 Hz in a national television standards committee (NTSC) scheme. For example, the panel driver 36 may be driven at 200 Hz or 240 Hz.

The panel driver 36 includes a data driver for driving the data lines of the display panel 32 and a gate driver for driving the gate lines of the display panel 32.

The data driver includes a plurality of source driver integrated circuits (ICs). Each of the source driver ICs includes a shift register, a latch, a digital-to-analog converter (DAC), an output buffer, etc. The data driver latches the 2D/3D data under the control of the timing controller 34. The data driver converts the 2D/3D data into positive and negative analog gamma compensation voltages in response to a polarity control signal and inverts a polarity of a data voltage. The data driver outputs the data voltage, which is synchronized with a scan pulse (or a gate pulse) output from the gate driver, to the data lines. The source driver ICs of the data driver may be mounted on a tape carrier package (TCP) and may be bonded to the lower glass substrate of the display panel 32 through a tape automated bonding (TAB) process.

The gate driver includes a shift register, a multiplexer array, a level shifter, etc. The gate driver sequentially supplies the scan pulse to the gate lines under the control of the timing controller 34. The gate driver may be mounted on the TCP and may be bonded to the lower glass substrate of the display panel 32 through the TAB process. Alternatively, the gate driver may be may be directly formed on the lower glass substrate of the display panel 32 through a gate-in-panel (GIP) process at the same time as the pixel array.

The retarder 38 includes first and second retarders, whose light absorption axes are perpendicular to each other. Hence, the retarder 38 may be implemented as a patterned retarder for spatially dividing circular polarization characteristics. Alternatively, the retarder 38 may be implemented as an active retarder, which includes an isotropic material, whose polarization characteristics are changed by the electrical control, and divides circular polarization characteristics in terms of time (for example, in each frame). The retarder 38 is attached to the upper polarizing film of the display panel 32.

When the retarder 38 is implemented as the patterned retarder, the retarder 38 includes first retarders and second retarders, which are alternatively arranged along the lines of the display panel 32. The first retarders are opposite to odd-numbered display lines of the pixel array and transmit first circularly polarized light (for example, left-circularly polarized light) of light incident from the odd-numbered display lines of the pixel array. The second retarders are opposite to even-numbered display lines of the pixel array and transmit second circularly polarized light (for example, right-circularly polarized light) of light incident from the even-numbered display lines of the pixel array.

When the retarder 38 is implemented as the active retarder, the retarder 38 transmits first polarized light (for example, left-circularly polarized light) of light incident from the pixel array in left eye frames in which left eye image data is displayed. Further, the retarder 38 transmits second polarized light (for example, right-circularly polarized light) of light incident from the pixel array in right eye frames in which right eye image data is displayed.

The polarized glasses 39 include a left eyeglass 39L having a first polarizing filter and a right eyeglass 39R having a second polarizing filter. The first polarizing filter transmits the first polarized light incident from the retarder 38, and the second polarizing filter transmits the second polarized light incident from the retarder 38. A user may view a 3D image through the polarized glasses 39 in the spatial division manner or the time division manner.

Figure 3:
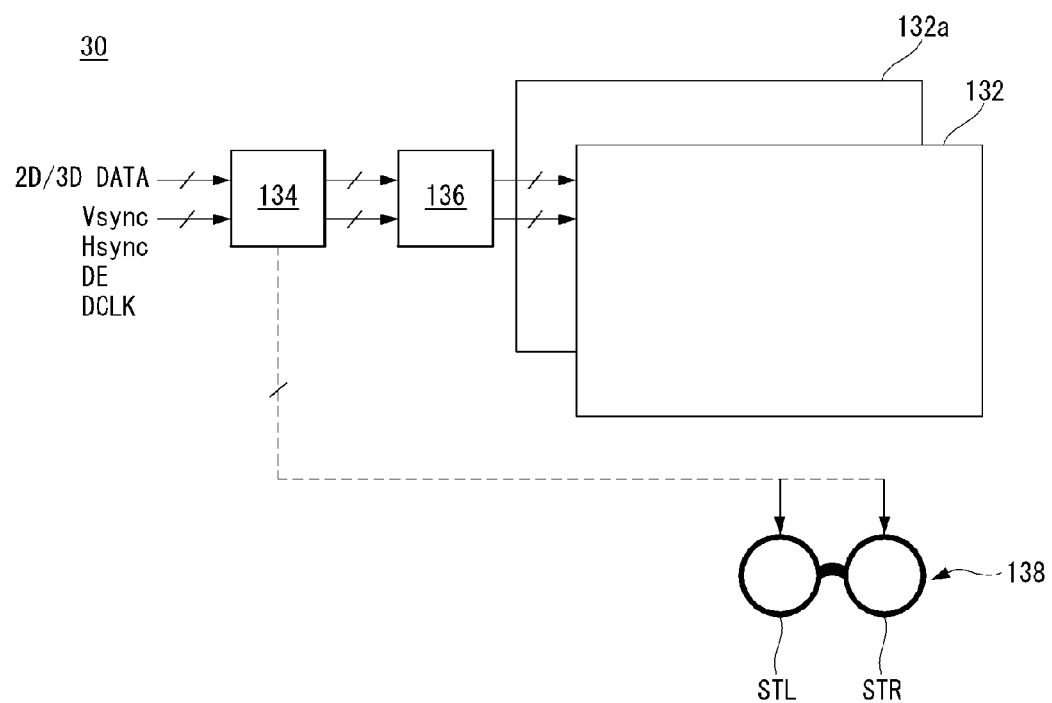
FIG. 3 illustrates a display block implemented as a liquid crystal shutter glasses type display element.

As shown in FIG. 3, when the display block 30 is implemented as the liquid crystal shutter glasses type display element, the display block 30 includes a display panel 132, a timing controller 134, a panel driver 136, and liquid crystal shutter glasses 138.

Since the display panel 132 shown in FIG. 3 is substantially the same as the display panel 32 shown in FIG. 2, a further description may be briefly made or may be entirely omitted.

The timing controller 134 controls an operation of the liquid crystal shutter glasses 138 in the time division manner, in addition to the function of the timing controller 34 shown in FIG. 2. Further, the timing controller 134 controls an operation of the panel driver 136, so that the 3D data is applied to the display panel 132 in the time division manner. Turn-on and turn-off timings of a backlight unit 132a may be controlled in consideration of the display timing of the 3D data of the timing controller 134.

Since the panel driver 136 shown in FIG. 3 is substantially the same as the panel driver 36 shown in FIG. 2, a further description may be briefly made or may be entirely omitted.

The liquid crystal shutter glasses 138 include a left eye shutter STL and a right eye shutter STR which are separately controlled electrically. Each of the left eye shutter STL and the right eye shutter STR includes a first transparent substrate, a first transparent electrode formed on the first transparent substrate, a second transparent substrate, a second transparent electrode formed on the second transparent substrate, and a liquid crystal layer interposed between the first and second transparent substrates. A reference voltage is supplied to the first transparent electrode, and an ON or OFF voltage is supplied to the second transparent electrode. When the ON voltage is supplied to the second transparent electrode, each of the left and right eye shutters STL and STR transmits light from the display panel 132 under the control of the timing controller 134. On the other hand, when the OFF voltage is supplied to the second transparent electrode, each of the left and right eye shutters STL and STR blocks the light from the display panel 132 under the control of the timing controller 134. The left eye shutter STL is opened during a period, in which the left eye image data is displayed on the display panel 132, and the right eye shutter STR is opened during a period, in which the right eye image data is displayed on the display panel 132. The user may view the 3D image, which is displayed on the display panel 132 in the time division manner, through the left and right eye shutters STL and STR, which reversely perform open and close operations in each frame period.

Figure 4:
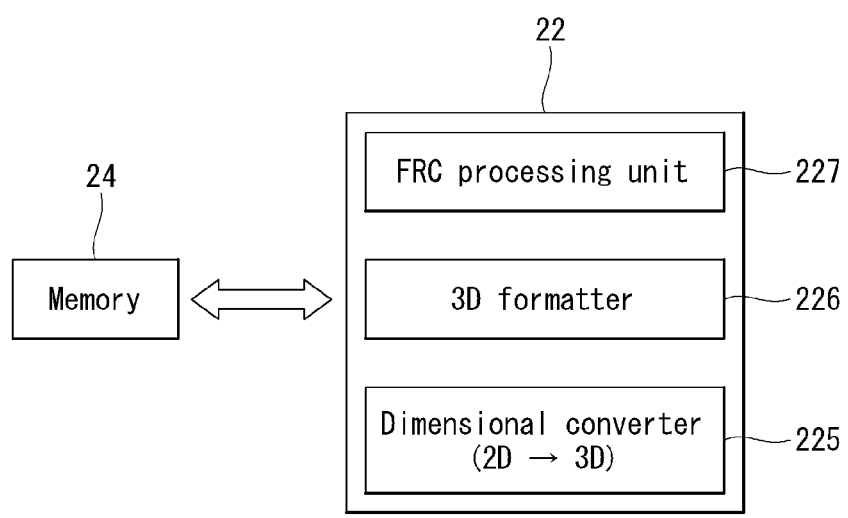
FIG. 4 illustrates a single multifunctional chip and a memory included in a multifunctional block.

As shown in FIG. 4, the multifunctional block 20 includes a single multifunctional chip 22 including a dimensional converter 225, a 3D formatter 226, and a frame rate-up conversion (FRC) processing unit 227, and a memory 24. The dimensional converter 225 reflects a depth information on 2D data based on motion evaluation for extracting an object and converts the 2D data into 3D data. The 3D formatter 226 renders the 3D data. The FRC processing unit 227 up converts a frame rate of the 2D data based on the motion evaluation. The memory 24 individually stores the 2D data of a predetermined amount (for example, one frame) for the motion evaluation. The multifunctional block 20 may be mounted on a control board included in the display block 30 along with the timing controller. The multifunctional block 20 may be mounted on a system board included in the system block 10.

The multifunctional block 20 integrates the components 225, 226, and 227 related to image processing into one part through the single multifunctional chip 22, thereby simplifying the configuration of the image display device. Further, the components 225, 226, and 227 of the multifunctional block 20 share main algorithm cores related to the image processing with one another through the single multifunctional chip 22, thereby greatly increasing the image processing efficiency. In addition, because the multifunctional block 20 includes one shared memory 24 corresponding to the single multifunctional chip 22, the number of memories may be reduced as compared to the related art image display device. Hence, the multifunctional block 20 greatly contributes a reduction in the manufacturing cost of the image display device.

The configuration of the single multifunctional chip 22 is described in detail below with reference to FIG. 5.

Figure 5:
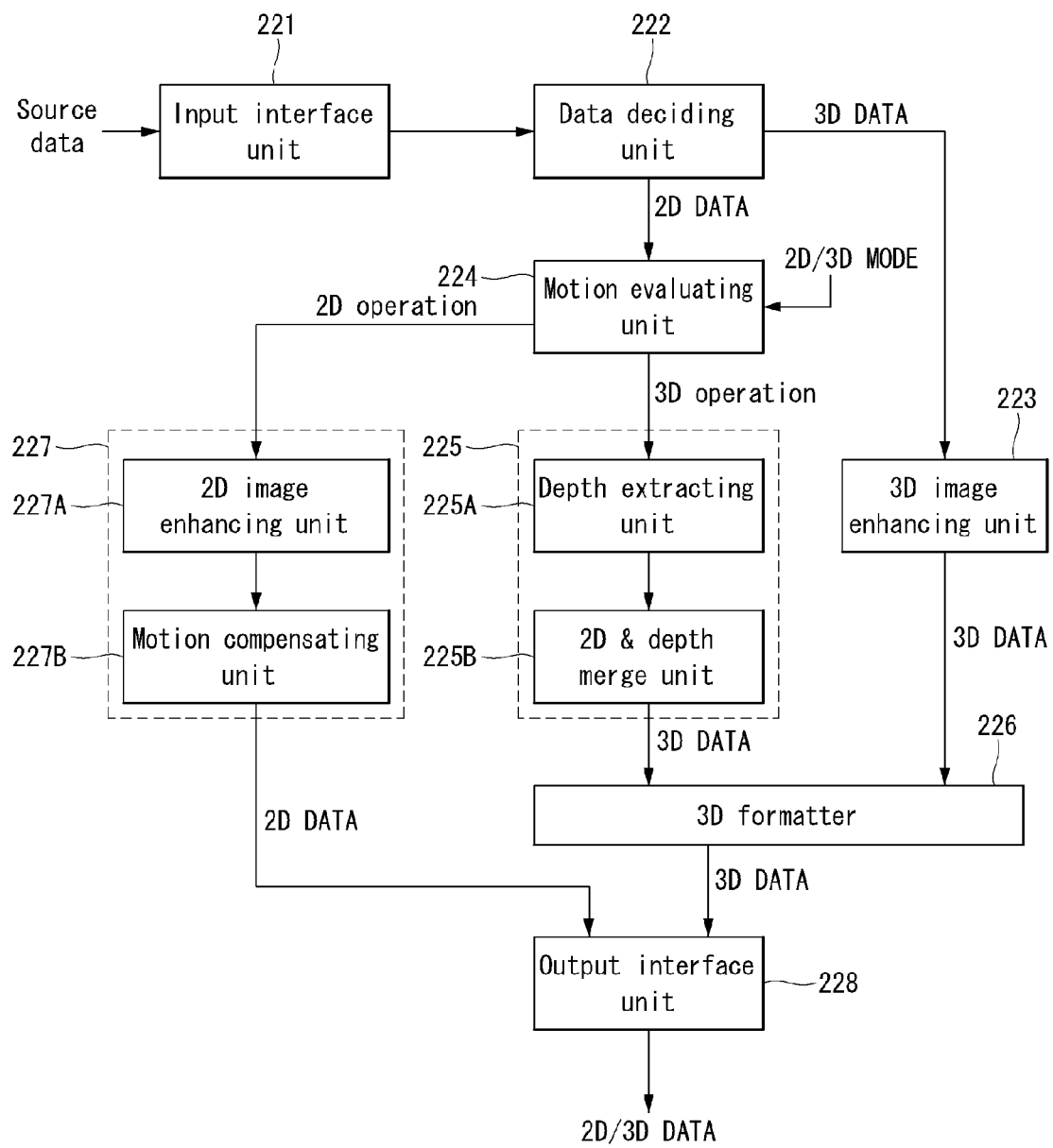
FIG. 5 illustrates a configuration of a single multifunctional chip.

As shown in FIG. 5, the single multifunctional chip 22 includes an input interface unit 221, a data deciding unit 222, a 3D image enhancing unit 223, a motion evaluating unit 224, the dimensional converter 225, the 3D formatter 226, the FRC processing unit 227, and an output interface unit 228.

The input interface unit 221 receives source data from the system block 10 in a 1-port low-voltage differential signaling (LVDS) manner.

The data deciding unit 222 decides whether the source data from the input interface unit 221 is 2D data or 3D data. When the source data is the 3D data, the data deciding unit 222 decides a type of the 3D data. The type of the 3D data may be classified into a side by side type in which the left eye image data and the right eye image data are arranged left and right; a top and bottom type in which the left eye image data and the right eye image data are arranged up and down; a frame to frame type in which the left eye image data and the right eye image data are alternatively arranged every one frame; and an interlace type in which the left eye image data and the right eye image data are alternatively arranged every one horizontal line.

When the source data is the 3D data, the 3D image enhancing unit 223 adjusts a depth of the 3D data from the data deciding unit 222 based on the type of the 3D data and performs a filtering process for removing a noise on the 3D data, thereby improving the quality of the 3D image. The 3D image enhancing unit 223 supplies the 3D data with the enhanced image quality to the 3D formatter 226.

When the source data is the 2D data, the motion evaluating unit 224 compares 2D data of a current frame received from the data deciding unit 222 with 2D data of a previous frame stored in the memory 224 and evaluates a motion of the 2D data. Hence, the motion evaluating unit 224 extracts an object from the 2D data of the current frame based on the motion evaluation. The motion evaluating unit 224 supplies the dimensional converter 225 with the 2D data, whose the object is extracted in a 3D mode in response to a mode selection signal received from the outside. Further, the motion evaluating unit 224 supplies the FRC processing unit 227 with the 2D data, whose the object is extracted in a 2D mode in response to the mode selection signal.

The dimensional converter 225 includes a depth extracting unit 225A, which extracts a depth information previously determined based on the extracted object, and a 2D & depth merge unit 225B, which merges the extracted depth information into the 2D data received from the motion evaluating unit 224. The dimensional converter 225 converts the merged 2D data into the 3D data and then supplies the 3D data to the 3D formatter 226.

The 3D formatter 226 renders the 3D data received from the 3D image enhancing unit 223 and the dimensional converter 225 in conformity with a driving environment of the display block 30 (including a resolution of the display panel, a driving frame frequency, etc.) and then supplies the rendered 3D data to the output interface unit 228.

The FRC processing unit 227 includes a 2D image enhancing unit 227A and a motion compensating unit 227B. The 2D image enhancing unit 227A enhances the image quality of the 2D data through saturation adjustment, color adjustment, etc. The motion compensating unit 227B inserts an interpolation frame, which is previously determined based on a movement of the object, between frames of the 2D data with the enhanced image quality. The FRC processing unit 227 compensates for a motion blue of the 2D data received from the motion evaluating unit 224 and then supplies the compensated 2D data to the output interface unit 228.

The output interface unit 228 outputs the 3D data received from the 3D formatter 226 and the 2D data received from the FRC processing unit 227 to the display block 30 in a 2-port mini-LVDS manner.

As described above, the image display device according to the embodiment of the invention integrates the image processing related components (i.e., the dimensional converter, the 3D formatter, and the FRC processing unit), which are divided into two chips in the related art, into one chip, thereby increasing the image processing efficiency and reducing the manufacturing cost.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An image display device comprising:
an input interface configured to receive source data from a video signal received from the outside;
a display configured to display 2D data or 3D data included in the source data; and
a multifunctional block including a single multifunctional chip for integrating a first function, a second function, and a third function and a memory, the first function reflecting a depth information on the 2D data based on motion evaluation for extracting an object and converting the 2D data into the 3D data, the second function rendering the 3D data in conformity with a driving environment of the display, the third function up-converting a frame rate of the 2D data based on the motion evaluation, the memory individually storing the 2D data of a predetermined amount for the motion evaluation, wherein the input interface is physically connected to the multifunctional block,
wherein the single multifunctional chip includes:
a data deciding unit configured to decide whether the source data is the 2D data or the 3D data, and decide a type of the 3D data according to an arrangement of a left eye image and a right eye image data of the 3D data when the source data is the 3D data;
a 3D image enhancing unit configured to adjust a depth of the 3D data from the data deciding unit based on the type of the 3D data, and remove a noise on the 3D data to improve quality of the 3D image;
a motion evaluating unit configured to compare 2D data of a current frame received from the data deciding unit with 2D data of a previous frame stored in the memory when the source data is the 2D data, evaluate a motion of the 2D data, and extract an object from the 2D data of the current frame based on the motion evaluation;

a dimensional converter configured to extract a depth information previously determined based on the extracted object, merge the extracted depth information into the 2D data received from the motion evaluating unit, and convert the merged 2D data into the 3D data;

a 3D formatter configured to render the 3D data received from the dimensional converter and the 3D data received from the 3D image enhancing unit in conformity with the driving environment of the display; and a frame rate-up conversion processing unit configured to enhance image quality of the 2D data received from the motion evaluating unit, insert an interpolation frame, which is previously determined based on a movement of the object, between frames of the 2D data with the enhanced image quality, and compensate for a motion blur of the 2D data received from the motion evaluating unit, wherein the dimensional converter, the 3D formatter and the frame rate-up conversion processing unit share main algorithm cores of the single multifunctional chip, wherein the dimensional converter, the 3D formatter and the frame rate-up conversion processing unit share the memory of the single multifunction chip, and wherein the motion evaluating unit receives the 2D data from the data deciding unit and directly supplies the 2D data to the dimensional converter, in response to a mode selection signal received from the outside setting a 3D mode, and the motion evaluating unit directly supplies the 2D data to the frame rate-up conversion processing unit, in response to a mode selection signal received from the outside setting a 2D mode.

2. The image display device of claim 1, wherein the multifunctional block is mounted on a control board included in the display block or a system board included in the system block.

3. The image display device of claim 1, wherein the motion evaluating unit supplies the dimensional converter with the extracted object in response to a 2D mode selection signal received from the outside, and wherein the motion evaluating unit supplies the frame rate-up conversion processing unit with the extracted object in response to a 3D mode selection signal.

4. The image display device of claim 1, wherein the single multifunctional chip further includes:

an input interface unit configured to receive the source data from the system block; and an output interface unit configured to output the 3D data received from the 3D formatter and the 2D data received from the frame rate-up conversion processing unit to the display block.

5. The image display device of claim 1, wherein the display block is implemented as a polarized glasses type display element or a liquid crystal shutter glasses type display element.

6. The image display device of claim 1, wherein the single multifunctional chip shares algorithm cores for the first to third functions.

* * * * *